Sept. 27, 1960 E. L. GRUENBERG 2,954,553

TRAVELING WAVE TUBE DEVICE

Filed March 26, 1956 3 Sheets-Sheet 1

INVENTOR
ELLIOT L. GRUENBERG.
BY
Moses, Nolte, Crews, + Berry
ATTORNEYS.

Sept. 27, 1960 E. L. GRUENBERG 2,954,553
TRAVELING WAVE TUBE DEVICE
Filed March 26, 1956 3 Sheets-Sheet 2

INVENTOR
ELLIOT L. GRUENBERG.
BY
Moses, Nolte, Crewe, + Berry.
ATTORNEYS.

Sept. 27, 1960 E. L. GRUENBERG 2,954,553

TRAVELING WAVE TUBE DEVICE

Filed March 26, 1956 3 Sheets-Sheet 3

INVENTOR
ELLIOT L. GRUENBERG.
BY
Moses, Nolte, Crews + Berry.
ATTORNEYS.

United States Patent Office 2,954,553

Patented Sept. 27, 1960

2,954,553

TRAVELING WAVE TUBE DEVICE

Elliot L. Gruenberg, Brooklyn, N.Y., assignor to The W. L. Maxson Corporation, New York, N.Y., a corporation of New York Filed Mar. 26, 1956, Ser. No. 573,919

14 Claims. (Cl. 343—100)

The present invention relates to electron discharge devices and circuits therefor, particularly of the traveling wave tube type.

Traveling wave tubes are provided with a transmission line, usually in the form of a helix, arranged so as to propagate a traveling wave along an electron beam passing through the helix parallel to its axis. The helix generally has an input connection to a radio frequency source at one end and an output connection at the other end.

According to the present invention, means are provided for controlling the output of the traveling wave tube in accordance with any desired signal, in addition to the input signal. Generally speaking, this is done by modulating the velocity of the electron beam in accordance with a second input signal and then causing the electron beam to traverse a modulating means or a gate which varies the amplitude of the electron beam current in accordance with the velocity of the electrons in a desired manner so that the output of the traveling wave tube is a predetermined function of the second input signal.

In many applications, such as in radar systems, it is desirable to maintain a nearly constant output even though the microwave input signals may vary over a great range such as a 1000:1. When pulses of carrier waves are being received, it is desirable to maintain this constancy of the output without serious distortion of the pulses, even though the pulse width may vary from 0.1 to 10 microseconds. Such constant output systems are commonly referred to as instantaneous automatic gain control systems.

One object of the present invention is to provide instantaneous automatic gain control for signals of any radio frequency at which it is possible to employ traveling wave tube techniques, such as frequencies in a range of 1000 to 15,000 megacycles.

Another object of the invention is to provide apparatus capable of modulating low level microwave signals with the modulation of other low level radio frequency signals.

Another object of the invention is to reduce the noise level of a traveling wave tube amplifier.

Other objects and advantages of the invention will become apparent from the following description and the drawings, in which.

Figure 1:
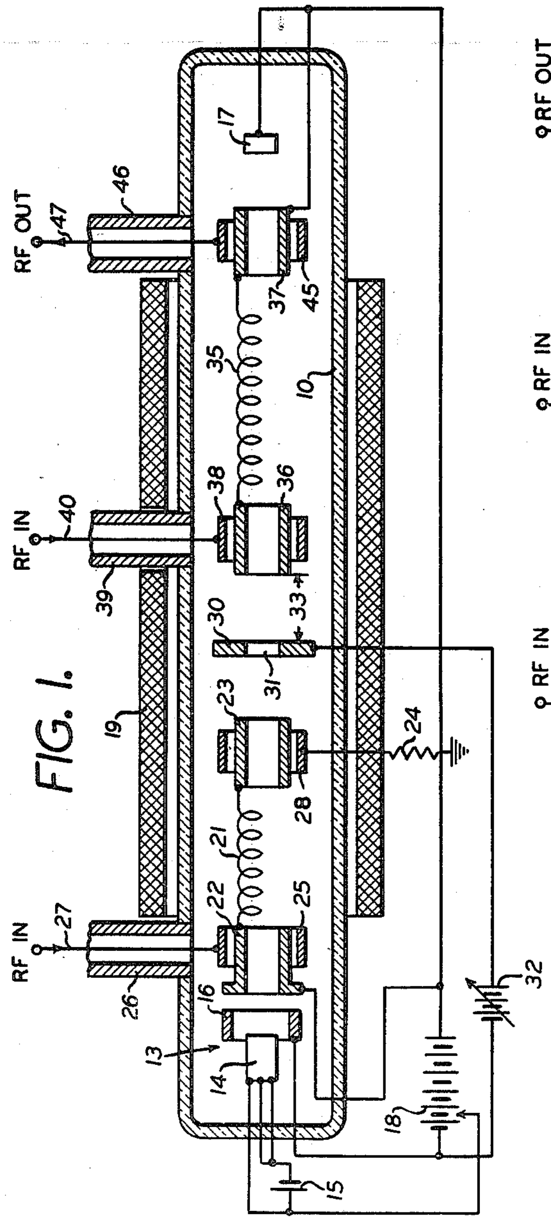
Fig. 1 shows an embodiment of the invention in which two helical coils are used.

Referring to the drawing, there is illustrated in Fig. 1, a traveling wave tube having an evacuated glass envelope 10. The tube is provided with an electron gun 13 of any suitable type for producing a focused high velocity electron beam. The electron gun comprises a cathode 14 adapted to be heated by current from a suitable source 15. The electron gun includes a focusing electrode 16 and may be provided with other focusing electrodes and electron accelerating electrodes, as is well known in the art. The electrons are projected by electron gun 13 toward collector electrode 17, which is connected to high voltage source 18. The electron beam is maintained in a focused condition throughout its length by any suitable focusing means, such as focusing coil 19 which produces an axial magnetic field along substantially the entire length of the electron beam. After leaving the electron gun, the electrons are projected through elongated conductive helix 21. Helix 21 reduces the velocity of the wave propagated therealong so as to make the wave velocity substantially equal to the velocity of the electrons. Helix 21 is provided with any suitable means for preventing standing waves. For example, conductive cylinder 23 may be coupled to cylinder 28 which may be terminated by resistor 24, the value of which is substantially equal to the surge impedance of helix 21, in order to prevent reflection from the end of the helix and to insure that the waves are propagated along the helix as traveling waves with a minimum standing wave component. Conductive cylinder 22 at the input end of the helix is capacitively coupled to conductive cylinder 25, which, in turn, is connected to a source of input signals by inner conductor 27 of coaxial line 26. It will be understood that any other means for impressing an input wave on helix 21 may be used.

After traversing helix 21 and conductive cylinder 23, the electron beam passes through a metallic plate 30, having an aperture 31. The aperture preferably is large enough to permit the beam to pass therethrough. Plate 30 is maintained at a suitable potential by a battery or voltage source 32 which may be adjustable. Plate 30 is separated from a second conductive helix 35, having terminal conductive cylinders 36 and 37, by a drift space 33. The drift space is of such a dimension that the electrons will arrive at helix 35 with such velocity that a traveling wave may grow on helix 35. Also this drift space may be of such dimension that the electrons will be debunched when they arrive at the entrance of helix 35. A conductive cylinder 38 is capacitively coupled to cylinder 36 and connected to inner conductor 40 of coaxial line 39 for the purpose of feeding a second radio frequency input to helix 35. The output end of helix 35 is coupled to a coaxial line 46 having an inner conductor 47 connected to a conductive cylinder 45 which is in capacitive relation to conductive cylinder 37. Helix 35 is maintained at a suitable positive potential relative to the cathode by means of a connection to voltage source 18.

Figures 4, 5, 8:
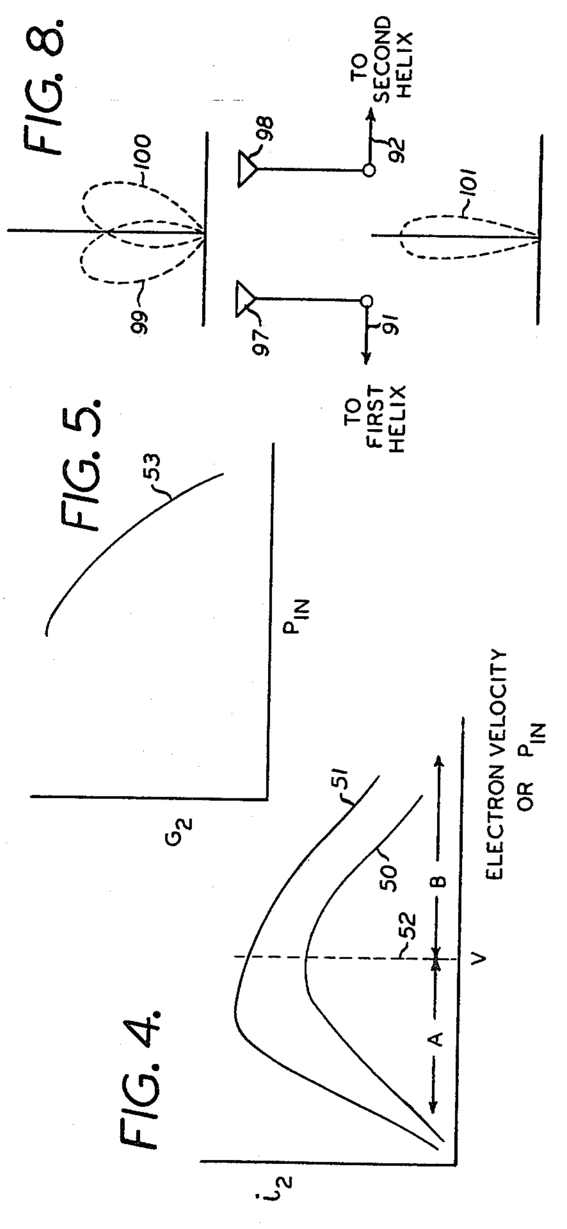
Figs. 4 and 5 are graphs illustrating the operating characteristics of the tube shown in Figs. 1 and 3.
Fig. 8 shows an antenna system adapted to be connected to the radio frequency input connection of the circuits of Figs. 1, 2, 3 and 7.

The operation of the apparatus thus far described is as follows: Electron gun 13 projects a substantially parallel high density electron beam to collector 17 through helix 21 and helix 35. High frequency signals are fed to helix 21 by coaxial line 26 through the coupling between conductive cylinders 22 and 25. The high frequency input waves are propagated along helix 21 toward conductive cylinder 23 with a velocity substantially equal to the velocity of the electrons. The electrons are thereby acted upon by the traveling wave electric field within helix 21 and, as a result, the velocity of the electrons is modulated in accordance with the input waves. The electrons, therefore, approach plate 30 with a velocity which varies in accordance with the input signal. The number of electrons which pass plate 30 and reach helix 35 depends on the electron velocity and on the potential applied to plate 30. In a particular construction, the current $i_2$ reaching helix 35 may vary as a function of the electron velocity or the input power $P_{in}$, as indicated by curves 50 and 51 of Fig. 4. Curves 50 and 51 correspond to two different combinations of gain, electron bunching and aperture parameters. The dotted line 52 of Fig. 4 represents the voltage applied to apertured plate 30. It can be shown that the amplification G produced by a traveling wave tube varies directly with the beam current $i_2$ approximately according to the formula $$G=K\sqrt[3]{i_2}$$

where K is a constant. Hence the amplification produced in the second region of the tube by helix 35 will be a function of the amplitude or the power of the signals fed to the first helix 21. The gain $G_2$ produced in the second region of helix 35 of the tube will vary as some function of the input power, as indicated by curve 53 of Fig. 5. The portion of tube 35 containing helix 35 functions similarly to a conventional traveling wave tube. The input signals impressed on the input of helix 35 may be the same as those impressed on helix 21, or may be derived from a different source.

Figure 2:
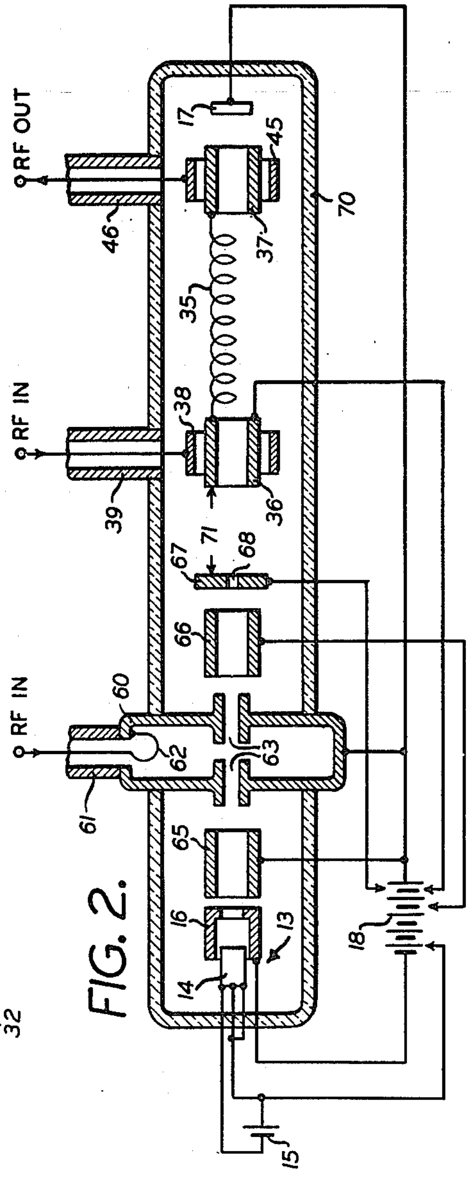
Fig. 2 shows another embodiment of the invention using a cavity resonator and one helical coil.

Fig. 2 shows a tube and circuit therefor which are similar to the tube and circuit of Fig. 1 except that the first helix is replaced by a cavity resonator 60. The cavity resonator is fed with an input signal by inner conductor 62 of coaxial line 61. The resonator is provided with apertures 63 in its opposite walls for enabling the electron beam to pass therethrough. An electron gun 13 including a cathode 14, a focusing electron 16 and an accelerating electrode 65 projects the electron beam through the cavity resonator and then through helix 35 to collector electrode 17. After traversing cavity resonator 60, the electron beam may pass through a second anode 66 and a plate 67 having an aperture 68. Aperture 68 may be made large enough to pass the entire electron beam, or it may be relatively small so that the entire beam will pass through it only when the beam is sharply focused at aperture 68. When a signal is fed to cavity resonator 60 by coaxial line 61, resonator 60 modulates the velocity of the electron beam. The variations of the velocity of the electron beam vary the focusing thereof, causing more or less of the electron beam to be intercepted by plate 67. Hence, the amplitude of the electron beam current reaching helix 35 can be made to either increase or decrease with an increase of signal fed to cavity resonator 60, depending on whether the beam is initially focused or defocused at the aperture. Additional focusing means may be inserted between plate 67 and helix 35.

The input end of helix 35 may be coupled to a second source of radio frequency signals through a pair of conductive cylinders 36 and 38, the latter of which is connected to coaxial line 39. The other end of helix 35 is coupled to an output circuit through conductive cylinders 37 and 45 and coaxial line 46. The tube may be provided with an evacuated envelope 70 and suitable means for maintaining the electrons in a substantially parallel beam, at least in the helix 35. Apertured plate 67 may be spaced from conductive cylinder 36 at the input end of helix 35 to provide a suitable drift space 71 which is dimensioned similarly to drift space 33 of Fig. 1. The tube shown in Fig. 2 operates similarly to that of Fig. 1. The output of the tube varies as the product of the functions of the two input signals. One of these functions may be an inverse function, as well as a direct function. It is evident that the signal applied to helix 35 will be modulated by the signals fed to the cavity resonator. If the same microwave signal is fed to both inputs, the output may be made to increase, decrease, or remain substantially constant as the amplitude of the input signals increases. In the case where aperture 68 is large such variations of the output will result as already described in connection with Fig. 1; and in the case where aperture 68 is small the variation of the output will depend upon whether the electron beam is initially focused or defocused at aperture 68, and upon the adjustment of other tube parameters.

Figure 3:
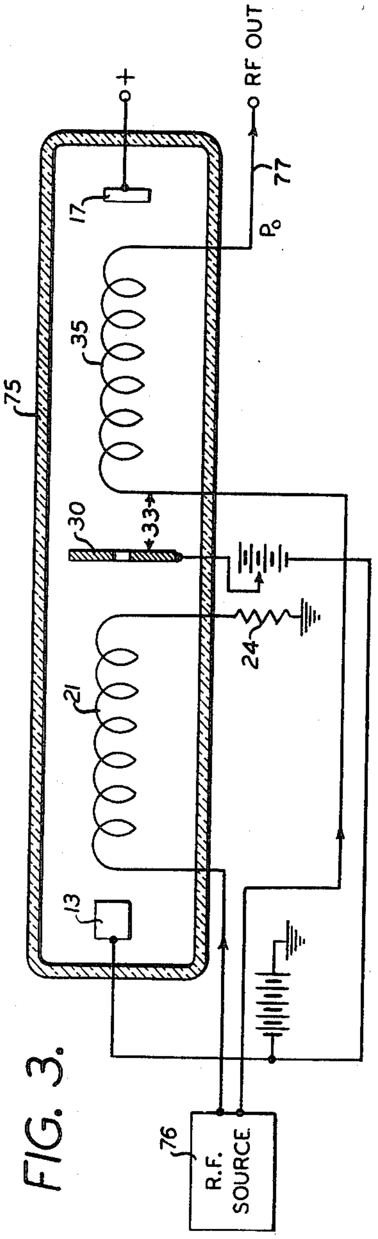
Fig. 3 shows an embodiment of the invention using an alternative circuit for a traveling wave tube of the type illustrated in Fig. 1.

It is often desirable, for example, in a radar receiver, to obtain output signals of relatively constant amplitude even though the input signals may vary in amplitude over a very wide range. This property of a circuit has been designated instantaneous automatic gain control or I.A.G.C. Fig. 3 shows circuit connections for obtaining such operation. An electron beam is projected from electron gun 13 through a first helix 21 and apertured plate 30 and a second helix 35 to collector electrode 17, enclosed within an evacuated envelope 75. The tube elements may be arranged as in the tube illustrated in Fig. 1. A R.F. source 76 may supply signals such as radar pulses of microwave frequency to helix 21 and to the input of helix 35. Helix 21 may be terminated by resistor 24 to prevent reflections. If the parameters are adjusted so that the tube will operate in a region B, Fig. 4, the beam current through helix 35 will vary inversely in accordance with the amplitude of the received signals impressed on helix 21. The output $P_0$ at output connection 77 of helix 35, will be $P_0=G_2P_2$, where $G_2$ is the gain produced by helix 35 and $P_2$ is the power input to helix 35. Hence the output $P_0$ consists of two factors, namely $G_2$ which varies inversely with the input power and $P_2$ which varies directly with the input power and, as a result, the parameters of the tube can be adjusted so that the tube operates on portion B of the curve 50 or 51 of Fig. 4, to yield a substantially constant output over a wide range of input power. The traveling wave tube characteristics of the circuit of Fig. 3 enable it to handle pulses having a very short duration and a very wide range of microwave frequencies.

Figure 6:
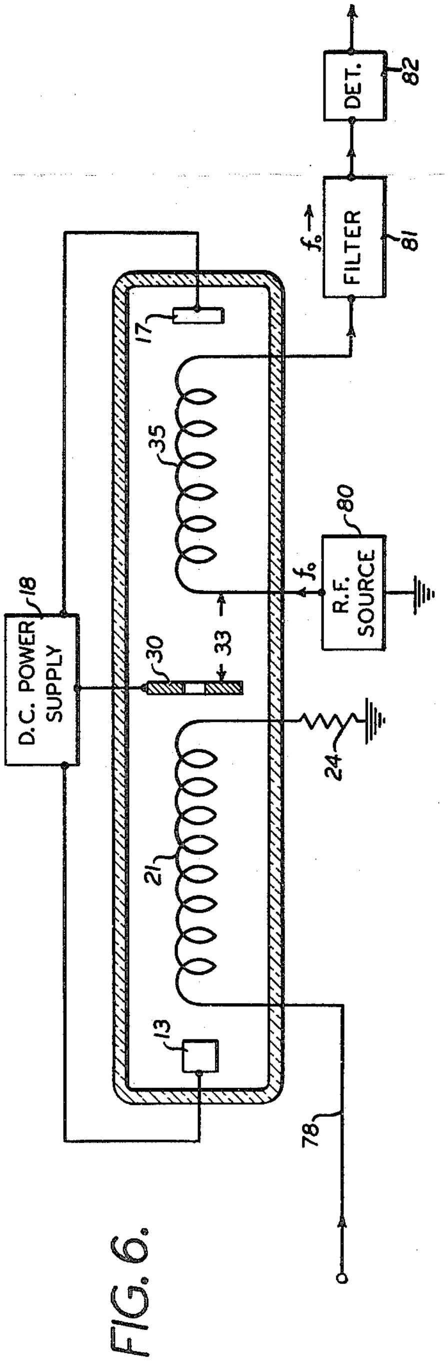
Figs. 6 and 7 show additional circuit arrangement for tubes of the types illustrated in Fig. 1.

Fig. 6 shows another circuit utilizing a tube of the same type as that shown in Figs. 1 and 3 and adapted to operate as a modulator. Microwave signals may be fed over input connection 78 to helix 21. The input end of helix 35 is connected to a radio frequency source 80 of oscillations of a frequency $f_0$. Electron beam current, after traversing helix 21 and apertured plate 30 and then passing through the drift space 33, will reach helix 35 with an amplitude which will vary in accordance with the amplitude of the signal supplied by input connections 78. The signals of frequency $f_0$ will be amplified by helix 35 and the amplification factor $G_2$ will be a function of the signals impressed on helix 21, as already explained. The output of helix 35 may be connected to a filter 81 adapted to pass the frequency $f_0$. Thus, the frequency $f_0$ will be modulated with the envelope of the signal supplied over input connection 78. The modulated wave of frequency $f_0$ may then be fed to a detector 82 or other suitable apparatus.

Figure 7:
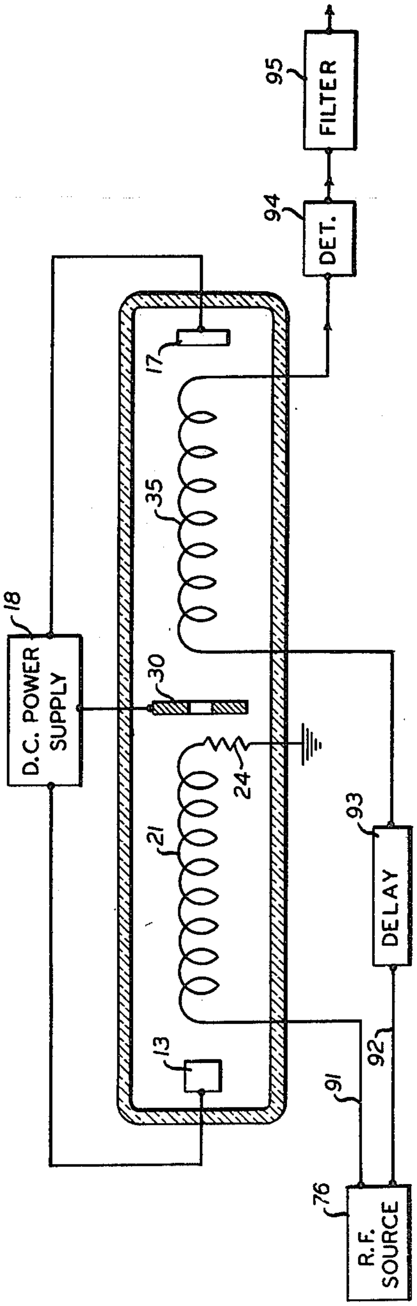

Fig. 7 shows a tube of the type shown in Fig. 1, but having connections which enable it to operate, for example, as an auto-correlator. Helix 21 is supplied with signals from source 76 by input connection 91 while helix 35 is supplied with signals from source 76 by a separate input connection 92 including a delay device 93. The delay device 93 may not be required under all circumstances. The circuit may be arranged so as to operate in the region A of Fig. 4 so that the output from helix 35 will vary directly as a product of the inputs supplied over connections 91 and 92. A noise burst, however, occurring in the region to the left of apertured plate 30 will, in general, not be simultaneous with a noise burst produced in the section of the tube to the right of apertured plate 30. In other words, the noise bursts in the two sections of the tube will not be correlated. Hence the noise output of the tube will be reduced. On the other hand, if signals of the same type are fed to input connections 91 and 92, these signals may be readily correlated in the two sections of the tube in order to produce an increase in output. The output of helix 35 may then be fed to a suitable utilization circuit consisting, for example, of a detector 94 and a narrow band pass filter 95.

A particular input arrangement for the circuit of Figs. 1, 2, 3 or 7 is shown in Fig. 8. The two signal input connections of the tubes previously described extend to antennas 97 and 98 having overlapping directional radiation patterns 99 and 100, respectively. Since the tube will have an appreciable output only when signals are supplied to both helices 21 and 35, an output will be produced only when signals arrive at antennas 97 and 98 from a direction covered by both antennas. The effective resultant radiation pattern will therefore be approximately as indicated by the curve 101. The circuit of Fig. 8 in combination with the circuits of Figs. 1, 2, 3 and 7 thus operates to sharpen the directivity pattern of the antenna system.

I have described what I believe to be the best embodiments of my invention. I do not wish, however, to be confined to the embodiments shown, but what I desire to cover by Letters Patent is set forth in the appended claims.

I claim:

1. A traveling wave tube device comprising means including an electron gun and a collector electrode for producing an electron beam along an extended path, a transmission line capable of propagating a traveling wave along said path, a high frequency output circuit coupled to the end of said transmission line near the collector electrode and a high frequency input connection coupled to the other end of said transmission line, a source of signals, electron velocity modulating means connected to said source of signals and positioned in the path of the electron beam between the transmission line and the electron gun for modulating the velocity of the electron beam in accordance with said signals, and means including a conductive member having an aperture in the path of the electron beam between the transmission line and the velocity modulating means for blocking the passage of more or less of the electron beam so that the amplitude of the electron beam current flowing through the aperture to the transmission line varies in accordance with the velocity of the electron beam.

2. A traveling wave tube device according to claim 1, wherein the velocity modulating means includes a cavity resonator, said cavity resonator having a pair of juxtaposed walls provided with apertures along the path of the electron beam for enabling the electron beam to traverse the cavity resonator.

3. A traveling wave tube device accoridng to claim 2, including a cylindrical focusing member positioned between said apertured member and said cavity resonator, said aperture being dimensioned so that said apertured member intercepts a portion of the electron beam when the electron beam is de-focused as a result of a variation of the velocity of the electrons.

4. A traveling wave tube device according to claim 1, wherein said velocity modulating means includes a second transmission line capable of propagating a traveling wave along said path with a velocity substantially equal to the velocity of the electron beam.

5. A traveling wave tube device according to claim 4, including means for applying a potential to the apertured member of such a value that the electron beam current reaching the first mentioned transmission line varies directly with the amplitude of the signals applied to the second transmission line.

6. A traveling wave tube device according to claim 4, including means for applying a potential to the apertured member of such a value that the electron beam current reaching the first mentioned transmission line varies inversely with the amplitude of the signals applied to the second transmission line.

7. A traveling wave tube device, according to claim 4, wherein the second transmission line is separated from the apertured member by a drift space of sufficient length to permit the electron beam to be de-bunched before entering the first transmission line.

8. A traveling wave tube device, according to claim 4, including a pair of directional microwave antennas having overlapping radiation patterns and means for connecting one antenna to the input of the first transmission line and the other antenna to the input of the second transmission line.

9. A traveling wave tube device, according to claim 4, including an oscillator of a frequency $f_0$ connected to the input of the first transmission line, the output circuit coupled to the first transmission including means for deriving modulated oscillations having a carrier frequency of $f_0$.

10. A traveling wave tube device according to claim 1, wherein said source of signals is coupled to the input connection of the transmission line.

11. A traveling wave tube device according to claim 1, including a delay circuit connecting said source of signals to the input connection of the transmission line.

12. A traveling wave tube device according to claim 1, wherein said source of signals is a source of modulated radio frequency waves, and means for impressing said signals on the input connection of the transmission line with such a phase relative to the signals on said velocity modulating means that the output of the transmission line varies directly as the product of the amplitudes of the signals applied to the transmission line and the velocity modulating means, whereby the amplification of the signal is increased without a corresponding increase of noise.

13. A traveling wave tube device according to claim 1, including means for connecting said source of signals to the input of the transmission line, said source providing signals of varying amplitude, and means including a source of voltage connected to said apertured conductive member for maintaining the output of said transmission line relatively constant irrespective of the variations of the amplitude of the signals.

14. A traveling wave tube device, comprising an electron gun and a collector electrode for producing an electron beam along an extended path, a conductive helix surrounding the electron beam for propagating a traveling wave along said path, a microwave signal input circuit connected to the end of said helix near the electron gun, means at the other end of said helix for preventing wave reflections therefrom, a conductive member located in the path of the electron beam near said other end of said helix and having an aperture of sufficient size to permit the electron beam to pass therethrough, a second helix located between the conductive member and the collector electrode and surrounding the electron beam for propagating a traveling wave along the electron beam, means for impressing a microwave signal on one end of said second helix, an output circuit connected to the other end of said second helix, the input end of said second helix being spaced from the apertured member by a drift space of a predetermined length, and means including a source of potential connected to the conductive member and the electrodes of the tube for varying the portion of the electron beam current passing through the conductive member and the second helix as a predetermined function of the amplitude of the signals impressed on the input end of the first helix.

References Cited in the file of this patent

UNITED STATES PATENTS

| | | |
|---|---|---|
| Re. 23,647 | Lindenblad | Apr. 21, 1953 |
| 2,657,305 | Knol et al. | Oct. 27, 1953 |
| 2,720,610 | Kazan | Oct. 11, 1955 |
| 2,762,948 | Field | Sept. 11, 1956 |